(12) United States Patent
Kellner et al.

(10) Patent No.: US 11,171,592 B2
(45) Date of Patent: Nov. 9, 2021

(54) ELECTRIC MACHINE

(71) Applicant: Siemens Aktiengesellschaft, Munich (DE)

(72) Inventors: Sven Ludwig Kellner, Erlangen (DE); Luca Silvio Rattaro, Erlangen (DE); Thilo Weigel, Nuremberg (DE); Ingo Geier, Cadolzburg (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 16/651,903

(22) PCT Filed: Sep. 18, 2018

(86) PCT No.: PCT/EP2018/075155
§ 371 (c)(1),
(2) Date: Mar. 27, 2020

(87) PCT Pub. No.: WO2019/063355
PCT Pub. Date: Apr. 4, 2019

(65) Prior Publication Data
US 2020/0266747 A1 Aug. 20, 2020

(30) Foreign Application Priority Data

Sep. 28, 2017 (EP) ..................................... 17193785

(51) Int. Cl.
*H02P 1/46* (2006.01)
*H02P 25/089* (2016.01)

(52) U.S. Cl.
CPC ................................. *H02P 25/089* (2016.02)

(58) Field of Classification Search
CPC .... H02P 25/089; H02P 21/14; H02P 2203/11; H02P 29/50
See application file for complete search history.

(56) References Cited

U.S. PATENT DOCUMENTS

2011/0089876 A1    4/2011    Patel et al.

FOREIGN PATENT DOCUMENTS

| CN | 203 151 413 U | 8/2013 |
| DE | 197 03 248 A1 | 8/1998 |

(Continued)

OTHER PUBLICATIONS

De Kock H W et al: "Anisotropy Comparison of Reluctance and PM ynchronous Machines for Position Sensorless Control Using HF Carrier Injection", IEEE Transactions on Power Electroni cs, D6 Institute of Electrical and Electronics Engineers, USA, vol. 24, Nr. 8, Aug. 1, 2009 (Aug. 1, 2009), Seiten 1905-1913, XP011271896, ISSN: 0885-8993, DOI: 10.1109/TPEL.2009.2017537; 2009.

(Continued)

*Primary Examiner* — Karen Masih
(74) *Attorney, Agent, or Firm* — Henry M. Feiereisen LLC

(57) ABSTRACT

In a method for operating an electric machine a first test signal is fed into the electric machine and a first response signal of the electric machine is measured. A first state variable for a rotor of a synchronous reluctance motor of the electric machine is determined as a function of the first response signal, and a second state variable for the rotor of the synchronous reluctance motor is determined. The first state variable and the second state variable are evaluated together.

17 Claims, 1 Drawing Sheet

(56) References Cited

FOREIGN PATENT DOCUMENTS

| EP | 2 192 413 A1 | 6/2010 | |
|---|---|---|---|
| EP | 2 226 929 A1 | 9/2010 | |
| EP | 2 023 479 B1 | 4/2014 | |
| WO | WO-2007085331 A1 * | 8/2007 | .............. H02P 25/03 |

OTHER PUBLICATIONS

Chen Zhe et al: "Sensorless Control for SPMSM With Concentrated Windings Using Multisignal Injection Method", IEEE Transactions on Industrial Electronics, IEEE Service Center, Piscataway, NJ, USA, vol. 61, No. 12, pp. 6624-6634, XP011558837, ISSN: 0278-0046, DOI: 10.1109/TIE.2014.2316257, [gefunden am Sep. 12, 2014]; 2014.

Kim Sang-Il et al: "A New Rotor Position Estimation Method of IPMSM Using All-Pass Filter on High-Frequency Rotating Voltage Signal Injection", IEEE Transactions on Industrial Electronics, IEEE Service Center, Piscataway, NJ, USA, vol. 63, No. 10, pp. 6499-6509, XP011622360, ISSN: 0278-0046, DOI: 10.1109/TIE.2016.2592464; [gefunden am Sep. 9, 2016] the whole Document; 2016.

Lara Jorge et al; "Performance study of switching frequency signal injection algorithm in PMSMs for EV propulsion: A comparison in stator and rotor coordinates", 2014 IEEE 23rd International Symposium on Industrial Electronics (ISIE), IEEE, pp. 865-870, XP032624090, DOI: 10.1109/ISIE.2014.6864725, [gefunden am Jul. 24, 2014], the whole document; 2014.

PCT International Search Report and Written Opinion of International Searching Authority dated May 19, 2016 corresponding to PCT International Application No. PCT/EP2018/075155 filed Nov. 28, 2018.

* cited by examiner

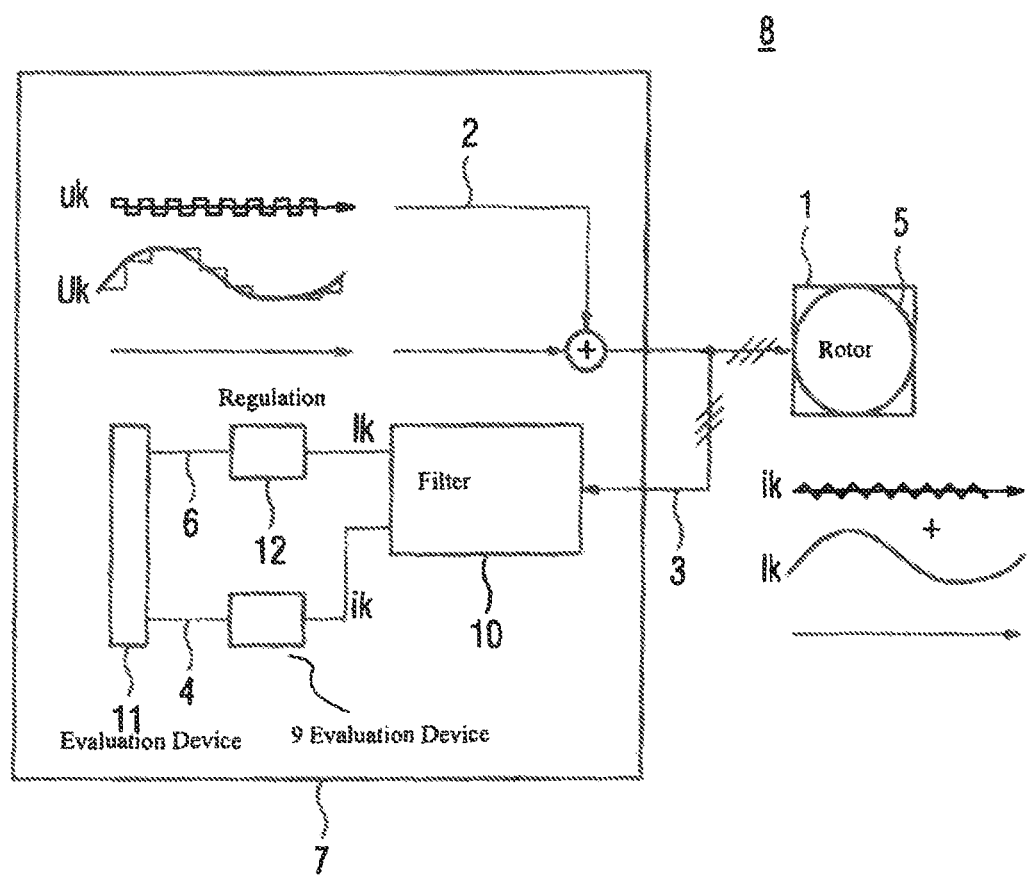

ELECTRIC MACHINE

CROSS-REFERENCES TO RELATED APPLICATIONS

This application is the US. National Stage of International Application No. PCT/EP2018/075155, filed Sep. 18, 2018, which designated the United States and has been published as International Publication No. WO 2019/063355 and which claims the priority of European Patent Application, Serial No. 17193785.7, filed Sep. 28, 2017, pursuant to 35 U.S.C. 119(a)-(d).

BACKGROUND OF THE INVENTION

The invention relates to an electric machine, in particular a synchronous machine, and operation thereof.

The operation of a synchronous machine is to be reliably carried out in many areas of application. A measuring system, for instance an encoder, is used to reliably operate the synchronous machine, for instance. A plurality of safety functions can be realized using an encoder. For reliable operation of electric machines, such as, in particular, a synchronous machine, safety functions are frequently required in order to limit speeds, velocities, axle positions, etc. To this end, frequency converters with integrated safety functions are used, or also safety PLCs, overspeed trips, etc. Position encoders with Sin/Cos interfaces are for the most part used for the associated sensor system in order to detect axle positions or angles of rotation on spindles. With these products, there are increasingly reliable embodiments which are provided for use in a specific performance level (PL) or SIL1.

Electric machines, such as synchronous machines, can also be operated without encoders. DE 197 03 248 A1 discloses for example a method and a device for determining a rotor angle speed of an encoderless induction machine which is operated in a field-oriented manner.

Known from EP 2 023 479 B1 is a system for seamlessly ascertaining the speed and/or position, including standstill, of a permanent magnet rotor of an electric machine. A method for ascertaining an electric drive speed and/or position from a measurement of a multi-phase stator current is described.

Known from EP 2 226 929 A1 is a plausibility monitoring system for movement measurements on an electric drive device. In a method for monitoring a movement measurement on an electric drive device for plausibility, the movement measurement of an encoder is monitored. On the basis of measurements of electrical currents in the drive device, one or more estimated values for the position, speed and/or acceleration of the drive device are generated, wherein the estimated value or values is/are compared for correspondence with one or more measured values generated from the encoder output signals.

One object of the invention is to specify an alternative operating method for an electric machine, wherein the alternative operating method is in particular a reliable method.

SUMMARY OF THE INVENTION

According to one aspect of the invention, the object is solved by a method for operating an electric machine, which is in particular a synchronous machine, wherein a first test signal is fed into the electric machine. The electric machine is in particular a synchronous reluctance machine. The synchronous reluctance machine has in particular a stream barrier cut or salient poles. The synchronous reluctance machine is in particular embodied so that its rotor has no permanent magnets, in other words is free of permanent magnets. A first response signal is measured and/or determined, wherein a first state variable for the rotor of the electric machine is determined as a function of the first test signal, in other words in particular as a function of the first response signal. A second state variable is determined for the rotor of the electric machine, wherein the first state variable and the second state variables are evaluated together. The first response signal is in particular dependent on the first test signal. The response signal is for instance a pulse response, a step response, etc. The response signal is based in particular on the measurement of a voltage and/or a current of the electric machine. The electric machine is fed by means of a converter. The converter is used to feed the test signal into the electric machine. The first state variable, like for instance a rotor speed or a rotor position, is determined in particular mathematically on the basis of the measured voltages and/or currents. The second state variable, like for instance a rotor speed or a rotor position, is also determined in particular mathematically on the basis of the measured voltages and/or currents. By determining the first state variable and the second state variable, a reliable operation of the electric machine can be enabled without the use of an encoder measuring system, since, for instance, a reliable determination of the rotor speed and/or the rotor position is possible. Therefore reliable operation can also be ensured with an encoderless regulation of an electric machine, like for instance a synchronous motor, up to standstill. In particular, encoderless synchronous motors can be operated as position-controlled axles, wherein both the position of the rotor and also the position of a mechanism can be calculated by way of algorithms.

The test signal can be considered to be an input signal for a system, like an electric machine, in order to obtain an output signal, in other words a response signal. Input signals for generating response signals can also be referred to as test signal.

In one embodiment of the method, a second test signal is fed into the electric machine in order to determine the second state variable, wherein a second response signal is measured and/or determined, wherein the second state variable is determined as a function of the second response signal.

In one embodiment of the method, a nominal size of a transvector regulation of the electric machine can also be used as a second response signal.

In one embodiment of the method, the second test signal can differ from the first test signal at least as a result of one of the following criteria:
  the first test signal is temporally offset relative to the second test signal;
  the first test signal has an amplitude which differs from the second test signal or
  the first test signal has a signal frequency which differs from the second test signal.

In one embodiment of the method, a state of the electric machine is determined in two separate channels. Reliable operation of the electric machine can be enabled by the dual-channel determination of the state, like for instance the rotor speed or the rotor position. The dual channel design can be achieved for instance by means of two test signals with a response signal in each case, but also with a test signal and two response signals resulting therefrom. A reliable item of position information is to be calculated by way of two separate channels for a reliable positioning in particular. This can be determined for instance by way of reliably evaluating the voltages and/or currents of the electric machine by way of two separate channels. For instance, in one embodiment, the same reliable test signal can be used for both channels.

In one embodiment of the method, two state variables are used to determine a specific state of the electric machine and are determined without encoders. A state of the electric machine can thus be reliably evaluated without encoders by way of two channels. Cost advantages result if an encoder is omitted. An encoderless operation of the electric machine can also make this more robust and increase its reliability.

In one embodiment of the method, the response signal is measured, in other words e.g. a voltage and/or a current are measured, at a higher frequency and/or scanning rate (e.g. at least 50% higher), than is necessary for the regulation of the electric machine, if the measured voltage and/or the measured current is also used as an actual value for regulating the electric machine.

In one embodiment of the method, the test signal has a frequency which is 50% higher than the maximum frequency of a target value of the electric machine. A target value of the electric machine is for instance a rotor speed, a phase voltage, a voltage indicator, a current indicator, a flow indicator, etc.

In one embodiment of the method, the first test signal and the second test signal are used to determine the same state of the rotor, in other words e.g. to determine the rotor position and/or the rotor speed.

In one embodiment of the method, if no adequately high voltage signal is present on account of the regulation of the electric machine, in other words in particular with the thus important speed being zero during positioning, a reliable impressing of the test signal (in particular test pulse) is carried out, wherein the test signal or the test pulses are also used by the regulation to calculate the rotor position signal.

In one embodiment of the method, the first test signal and/or the second test signal an overlaid signal. The overlaid signal is overlaid onto a signal which is used to regulate the electric machine. The regulation of the electric machine is in particular a field-oriented regulation. Examples of a signal of this type are a current target value and/or a voltage target value and/or a flow target value. These target values can be present in particular in a coordinate system used in the regulation, in other words e.g. a αβ coordinate system or a d/q coordinate system.

In one embodiment of the method, the first test signal and/or the second test signal is a signal fixed to the rotor. The d/q coordinate system comes to the fore here. In one embodiment of the method, the first test signal and/or the second test signal is a signal fixed to the stator. The αβ coordinate system comes to the fore here.

In one embodiment of the method, the first test signal is a test signal fixed to the stator and the second test signal is a test signal fixed to the rotor.

In one embodiment of the method, the first response signal is a response signal fixed to the stator and the second response signal is a response signal fixed to the rotor.

In one embodiment of the method, the state (e.g. the rotor position) of the electric machine is calculated in a first channel on the basis of a test signal fixed to the stator and in a second channel on the basis of a test signal fixed to the rotor. This dual channel system is used to reliably operate the electric machine.

In one embodiment of the method, the first test signal is orthogonal to the second test signal. Accordingly, two different channels are formed by way of test signals which are orthogonal to one another.

In one embodiment of the method, the state of the electric machine to be determined is a position, a speed and/or an acceleration.

In one embodiment of the method, the first test signal and/or the second test signal is torque-forming.

In one embodiment of the method, the first test signal and/or the second test signal are torque-neutral. Torque-neutral means that the test signal does not influence the position and/or the movement of the rotor of the electric machine.

In one embodiment of the method, the electric machine is an encoderless electric machine. A reliable evaluation of the measured values and calculation of the position and speed is also possible by means of the described method using suitable formulae and/or algorithms.

In one embodiment of the method, the electric machine is a synchronous machine, in particular a synchronous reluctance motor.

In one embodiment of the method, with the shared evaluation of the first state variable and the second state variable, these state variables are compared with one another, wherein when these two state variables match, a state of the electric machine is reliably identified. When checking for agreement between the two state variables, a threshold value can be set for a difference between these variables, for instance, wherein in particular a reliable state variable identification is only indicated when the value identified falls below the threshold value. The state or the state variable relates in particular to a position of the rotor of the electric machine.

In one embodiment of the method, a pulse signal is used for the first test signal and/or the second test signal.

An encoderless, reliable positioning and monitoring of axles is possible with one of the embodiments of the method. Both speed-related monitoring functions which do not require an absolute position value (Inter alia SOS) and also functions which require a reliable absolute position value form part of this.

According to another aspect of the invention, the object is solved by a drive system having at least one converter for driving an electric machine, wherein the converter is provided to impress a first test signal into the electric machine. The drive system can be provided to carry out the method described here. The drive system has in particular also an electric machine, which can be supplied with electrical energy by means of the converter, wherein the electric machine is in particular a synchronous reluctance motor.

In one embodiment of the drive system, the converter is provided to impress a second test signal into the electric machine.

In one embodiment of the drive system, at least one ASIC is provided with a converter pulse logic in order to generate the first test signal and/or the second test signal. The reliable impressing of the test signal, such as in particular test pulses, can take place for instance by means of corresponding hardware implementation of the test pulses. This is possible using ASICs in the converter, for instance, which have a pulse logic which can be used herefor.

In one embodiment of the drive system, a reliable processing and preparation of measured values takes place e.g. with corresponding safety precautions on shared or separate ASICs or FPGAs. Different channels are possibly used, as also described here.

The described method or the described drive system dispenses with an encoder for the electric machine by means of reliably impressing the test signals. A reliable evaluation which develops thereon occurs by way of two separate channels. The implementation can occur as described using different methods. A robust and cost-effective positioning of axles can therefore be achieved in particular.

With the aid of the method and/or devices described, safety-relevant functions can be fulfilled, such as e.g. a reliable absolute position.

BRIEF DESCRIPTION OF THE DRAWING

The invention and further embodiments of the invention according to the features of the subclaims are explained in more detail below on the basis of an exemplary embodiment shown schematically in the drawing, but without any restriction of the invention to this exemplary embodiment. It is shown in the sole FIG. a schematic illustration of a drive system according to the invention.

DETAILED DESCRIPTION OF PREFERRED EMBODIMENTS

A drive system 8 which has at least one converter 7 for driving an electric machine 1 is shown, wherein the converter 7 is provided to impress a first test signal 2 into the electric machine 1. The electric machine 1 has a rotor 5. The first test signal 2 has voltage jumps $u_k$, which are overlaid onto a torque-forming voltage $U_k$. According to a method for operating the electric machine 1, the first test signal 2 is fed into the electric machine 1, wherein a first response signal 3 is measured, wherein a first state variable 4 for the rotor 5 of the electric machine 1 is determined as a function of the first test signal 2 in an evaluation device 9. The response signal $i_k$ is filtered out of the evaluation by means of a filter 10. A second state variable 6 for the rotor 5 of the electric machine 1 is determined for instance by means of a regulation 12 for the electric machine 1, wherein the first state variable 4 and the second state variable 6 are evaluated together in a further evaluation device 11. The current $I_k$ forming as a result of the voltage $U_k$ can also be determined by way of the filter 10. With a sensorless regulation using test pulse evaluation, as shown, small voltage pulses $u_k$ are additionally overlaid onto the fundamental voltage $U_k$ (the fundamental voltage drives the machine). The information of the rotor position and speed can then be obtained from the correlation of this excitation with the generated pulse responses of the currents $I_k$ and $i_k$.

What is claimed is:

1. A method for operating an electric machine embodied as a synchronous reluctance motor, said method comprising:
   feeding a first test signal into the electric machine;
   measuring a first response signal of the electric machine;
   determining a first state variable for a rotor of the synchronous reluctance motor as a function of the first test signal;
   determining a second state variable for the rotor of the synchronous reluctance motor; and
   evaluating the first state variable and the second state variable together.

2. The method of claim 1, further comprising:
   feeding a second test signal into the electric machine to determine the second state variable;
   measuring a second response signal; and
   determining the second state variable as a function of the second response signal.

3. The method of claim 2, wherein at least one of the first test signal and the second test signal is an overlaid signal.

4. The method of claim 2, wherein at least one of the first test signal and the second test signal is a signal fixed to the rotor or a signal fixed to a stator of the synchronous reluctance motor.

5. The method of claim 2, wherein the first test signal and the second test signal are used to determine a same state of the rotor.

6. The method of claim 2, wherein the first test signal is orthogonal to the second test signal.

7. The method of claim 5, wherein the state is a position, a speed or an acceleration.

8. The method of claim 2, wherein at least one of the first test signal and the second test signal is torque-forming.

9. The method of claim 1, wherein the electric machine is an encoderless electric machine.

10. The method of claim 1, further comprising:
    comparing the first state variable and the second state variable with one another when they are evaluated together; and
    identifying a state of the electric machine when the first state variable and the second state variable agree.

11. The method of claim 10, wherein the state is a position of the rotor.

12. The method of claim 2, further comprising using a pulse signal for at least one of the first test signal and the second test signal.

13. A drive system, comprising:
    an electric machine; and
    a converter driving the electric machine, said converter configured to impress a first test signal into the electric machine, wherein the converter is configured to measure a first response signal of the electric machine, determine a first state variable for a rotor of the synchronous reluctance motor of the electric machine as a function of the first test signal, determine a second state variable for the rotor of the synchronous reluctance motor, and evaluate the first state variable and the second state variable together.

14. The drive system of claim 13, wherein the electric machine is a synchronous reluctance motor.

15. The drive system of claim 13, wherein the converter is configured to impress a second test signal into the electric machine.

16. The drive system of claim 15, wherein the converter includes an ASIC with pulse logic configured to generate the first test signal and/or the second test signal.

17. The drive system of claim 13, wherein the electric machine is an encoderless electric machine.

* * * * *